(12) United States Patent  
Cai

(10) Patent No.: US 7,643,623 B2
(45) Date of Patent: Jan. 5, 2010

(54) FLEXIBLE MOBILE PREPAID SCRATCH CARD RECHARGE

(75) Inventor: Yigang Cai, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 943 days.

(21) Appl. No.: 11/133,934

(22) Filed: May 20, 2005

(65) Prior Publication Data

US 2006/0262914 A1    Nov. 23, 2006

(51) Int. Cl.
*H04M 15/00* (2006.01)
(52) U.S. Cl. .............................. 379/114.16; 379/114.2; 379/121.02; 455/405; 455/408
(58) Field of Classification Search ................ 379/111, 379/114.01, 114.03, 114.06, 114.1, 114.12, 379/114.15, 114.16, 114.17, 114.18, 114.2, 379/144.01, 121.02; 455/405–408
See application file for complete search history.

(56) References Cited

U.S. PATENT DOCUMENTS

| 6,907,116 | B2 * | 6/2005 | Ung et al. ............... 379/114.16 |
| 2003/0008635 | A1 * | 1/2003 | Ung et al. .................... 455/408 |
| 2004/0001578 | A1 * | 1/2004 | Van Tonder ............ 379/114.01 |
| 2004/0133511 | A1 * | 7/2004 | Smith et al. .................... 705/39 |

* cited by examiner

*Primary Examiner*—Binh K Tieu
(74) *Attorney, Agent, or Firm*—Werner Ulrich

(57) ABSTRACT

This invention relates to a method and apparatus for flexibly controlling prepaid telecommunications charges. A scratch card recharge arrangement is used to prepay for future telecommunications calls. A flexible arrangement is provided to translate between the face value of a scratch card and the amount of telecommunications charges authorized for that scratch card. Advantageously, different vendors of scratch cards may provide different amounts of service for a scratch card with a given face value.

18 Claims, 3 Drawing Sheets

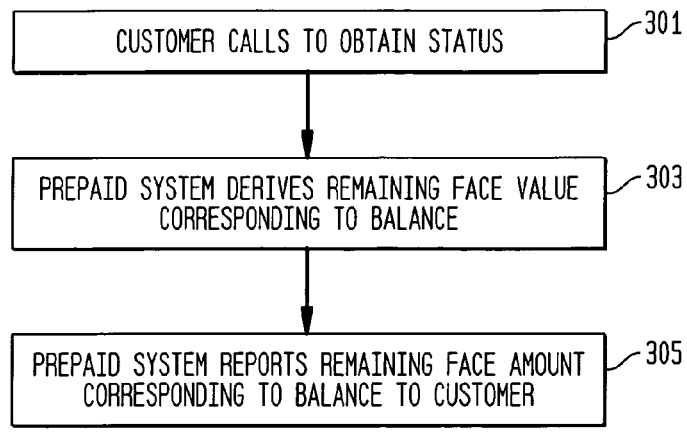
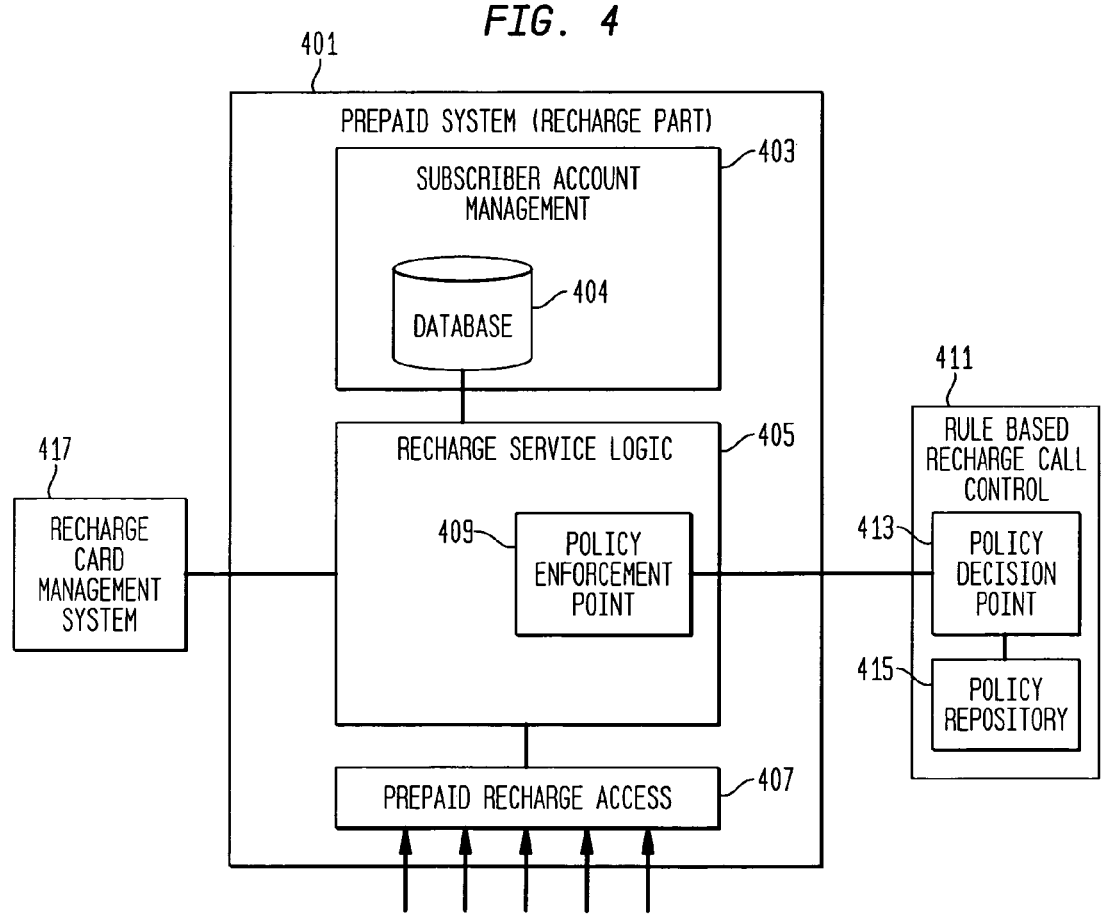

FLEXIBLE MOBILE PREPAID SCRATCH CARD RECHARGE

TECHNICAL FIELD

This invention relates a method and apparatus for providing flexibility in mobile prepaid scratch card systems and, more specifically, providing for arrangements wherein different resellers can provide different scratch card recharge rate plans with their scratch cards.

BACKGROUND OF THE INVENTION

Mobile telecommunications calls can be charged in one of two ways. Postpaid charging systems accumulate charges for a customer and send a bill to the customer on a monthly basis. Prepaid systems allow a customer to prepay for a certain number of minutes, or other parameter, and make calls against a balance record maintained in a prepaid system database of the carrier serving the customer; the balance is reduced as the customer makes calls and when the balance reaches zero the customer can no longer make calls based on the prepaid account. The mobile customer must purchase a recharge card to replenish his/her prepaid account. The most popular type of prepaid recharging card is a scratch card. The mobile customers can purchase the scratch cards from retailers or resellers. The scratch card has a face value and Personal Identification Number (PIN). The face value varies (such as $20, $50, $100 and $200). The scratch card PIN is a random number generated by the Recharge Card Management System (RCMS) and manufactured on the scratch card with a covering. The customer must scratch out the covering on the card to reveal the PIN. When scratch card batch is manufactured and distributed by the service provider to the reseller such as retailer, distributor, wholesaler or retail reseller this reseller can activate the batch before the card is sold to the end customer. When the end customer who purchased the scratch card and scratches out the PIN, he/she can use this PIN to replenish his/her mobile prepaid account.

There are many different ways to replenish the prepaid account.

(1) The end customer dials a 1-800 number to the service provider's prepaid system. An Interactive Voice Responder (IVR) will prompt the end customer to input the mobile phone number (if dialed from mobile handset, the mobile phone number automatically enters the system), and to select a prepaid account recharge from a menu prompt. The end customer then enters the PIN number. The prepaid system will use the received mobile phone number (subscriber ID) and PIN to validate the scratch card. It sends a validate query (with PIN) to the Recharge Card Management System (RCMS) which generated the scratch card batch; the RCMS stores all card information (include card batch number, serial number, PIN, status (new, activated, expired, used, etc), and card face value). RCMS receives the request from the prepaid system, validates the request against its database, if the card status is activated, the RCMS will return the response to the prepaid system with a return code (card is valid) and the card face value. The prepaid system will credit the face value amount to the end user prepaid account and play an announcement to the end customer (such as the recharge is completed, and a dollar amount is credit to your prepaid account). The prepaid system will also store an account lifecycle for the customer prepaid account (such as expiration date, recharge date). The RCMS will mark the card with this PIN as used so no future recharge with this PIN is allowed.

(2) A similar recharge can be conducted through reseller/retailer's terminals. The customer enters a mobile phone number and scratch PIN from Graphic User Interface (GUI) screen of the recharge system terminal. The recharge system will read the mobile phone number and scratch PIN, and send a query by any kind of interface to the prepaid system. The prepaid system validates the scratch card PIN with RCMS. If it is valid, the prepaid system receives the face value from the RCMS, the prepaid system credits the amount to the end user's prepaid account and also stores account lifecycle for the customer prepaid account (such as expiration date, recharge date). The RCMS will mark the card with this PIN as used so no future recharge with this PIN is allowed. The prepaid system sends a recharge result back to the reseller terminal; the end user can see the recharge result from a terminal or a printout.

(3) The RCMS (usually a third party system) will conduct the recharge validation when the end user inputs a mobile phone number and a scratch card PIN. The recharge system validates the scratch card directly with the RCMS and obtains the face value if the card is valid. The recharge system sends the end user mobile phone number and recharge face amount via any interface to the prepaid system. The prepaid system will credit the face amount to the end user's prepaid account and stores in the prepaid account a new lifecycle. The prepaid system returns recharge result back to the recharge system which acknowledges the end user.

(4) Customer Care System recharges. The end user can dial a 1-800 number to the customer care center (online help center) and provide a mobile phone number and scratch card PIN to a customer service representative (CSR). The CSR will fill in the subscriber ID (mobile phone number) and PIN in a recharge request to the prepaid system. The prepaid system will validate the scratch card with the RCMS and credit the recharge amount to the end user prepaid account, and return the result to CSR; or the CSR validates PIN with RCMS directly and obtains the validation response and card face value from RCMS. The CSR sends recharge amount to the prepaid system which credits the amount to the end user prepaid account.

After a recharge using a scratch card, the end user will have a positive prepaid account balance and is allowed to make phone calls.

A problem of the prior art is that there is not provided any arrangement for giving different resellers the ability to give a customer a greater number of minutes of service or call units for the same scratch card charge. In the prior art, all scratch card recharge will credit the card face value amount to subscriber prepaid account. Sometimes the prepaid system may add some bonus minutes to the subscriber's account as a recharge promotion. The recharge amount sometimes is converted into call units and stored in the subscriber prepaid account. However, the recharge amount will not affect the call rate—a dollar amount or call unit per minute which is pre-provisioned with the subscriber prepaid account as a class of services (COS) when the subscriber opens the prepaid account or when he/she purchase/register the mobile phone handset or requests a change in the COS with the service provider during the service period.

However, many service providers would like to provide end users a kind of promotion call rate which depends on the recharge scratch card type. This requests the prepaid system to adjust the credit amount vs. recharge amount (face value) to reflect a promotion call rate. For example, it might be desirable for subscriber A who has an account COS selection with a call rate $0.50/min. to use a promotional K-Mart recharge scratch card with face value $50 and promotion rate $0.25/ min. When he/she does replenishment to the prepaid account, the prepaid system will adjust the credit amount by $100. The customer's call rate within the system is still $0.50/min. (there is no change of COS), but the credited amount indeed reflects a promotion rate $0.25/min. for the recharge card.

A problem of the prior art is that there is no satisfactory method of providing a flexible prepaid scratch charge card for authorizing varying charges for different recharge rate plans.

SUMMARY OF THE INVENTION

The above problem is essentially solved and an advance is made over the prior art in accordance with this invention wherein the prepaid system accepts inputs from a card management system, the inputs indicating one or more of the following factors: the dollar face amount of the customer's scratch card; the card management system also provides the prepaid system with information concerning the identity of the reseller, type and size of bonus being provided to the customer, which type and size may be a function of the location of the reseller; the date of replenishment of the card; the expiration date of the prepayment, the class of service of the customer; the card face value adjustment policy; the recharge adjustment mode; responsive to receipt of this input the prepaid system calculates an artificial dollar amount for the scratch card which artificial dollar amount is stored in the database of the prepaid system. Effectively, this artificial dollar amount corresponds to the number of call units to which the purchaser of the scratch is entitled. Advantageously, this arrangement permits great flexibility in translating from a face value to an effective prepayment value.

In accordance with one feature of this invention, if the purchaser wishes to know his/her balance, in preparation for purchasing another scratch card or adding to the allowable charges in the present scratch card, the prepaid system reconverts from the artificial dollar amount stored in the database to a real dollar amount which, in effect, corresponds to the fraction of the originally purchased telecommunications services that are still available to the customer on this scratch card. Advantageously, the balance will reflect the rate plan associated with scratch card the end user purchased.

Some of the input variables for recharge artificial dollar amount are described below:

Reseller types by reseller name or reseller ID. Such as Alltel, BCGI, K-mart, Walgreen, Western Union. The Scratch cards are manufactured with a reseller identification.

Recharge face value amount. Such as $10, $20, $50, and $100 which are printed on the scratch cards. The recharge face amount is also stored with card's PIN and serial number/batch number at RCMS for card validation. During the validation, if the PIN matches, the RCMS will provide the prepaid system the face value.

Recharge rate plans. A recharge rate plan is predefined in card batch for particular reseller (also based on face value). Recharge rate plan can be recognized by a recharge rate ID which associated to card batch or can be derived from reseller type and card face value. One recharge rate ID indicates a recharge rate plan, for example, $0.25, $0.30, $0.35 and $0.40 per minute.

Recharge adjustment mode (e.g., interactive voice, reseller premises, etc.)

Recharge location (states)

Recharge date and time

Subscriber call rate plan Class of Service (COS) ($0.25, $0.30, $0.35 and $0.40 per minute)

In accordance with Applicant's preferred embodiment, the conversion between the real dollar amount (the amount that is shown on the face of the scratch card) and the artificial dollar amount (corresponding to the charge amount to which the customer is still entitled) is made through a rule-based conversion process. This rule-based conversion process makes it possible for a carrier to add, subtract, or change charging features for different resellers at any time in a straightforward manner. In Applicant's preferred embodiment, the rule-based system comprises a series of IF-ELSE-THEN statements using such parameters as the identity of the reseller, the size and timing of the reseller's bonus. Advantageously, the rule-based arrangement makes it very easy to enter and edit changes in the face value to artificial dollar amount conversion.

BRIEF DESCRIPTION OF THE DRAWING(S)

FIG. 3 is a flow diagram illustrating the process of reporting to a holder of a scratch card the remaining face card balance of his/her scratch card; and FIG. 4 is a block diagram of the prepaid system, highlighting the recharge part.

DETAILED DESCRIPTION

Figure 1:
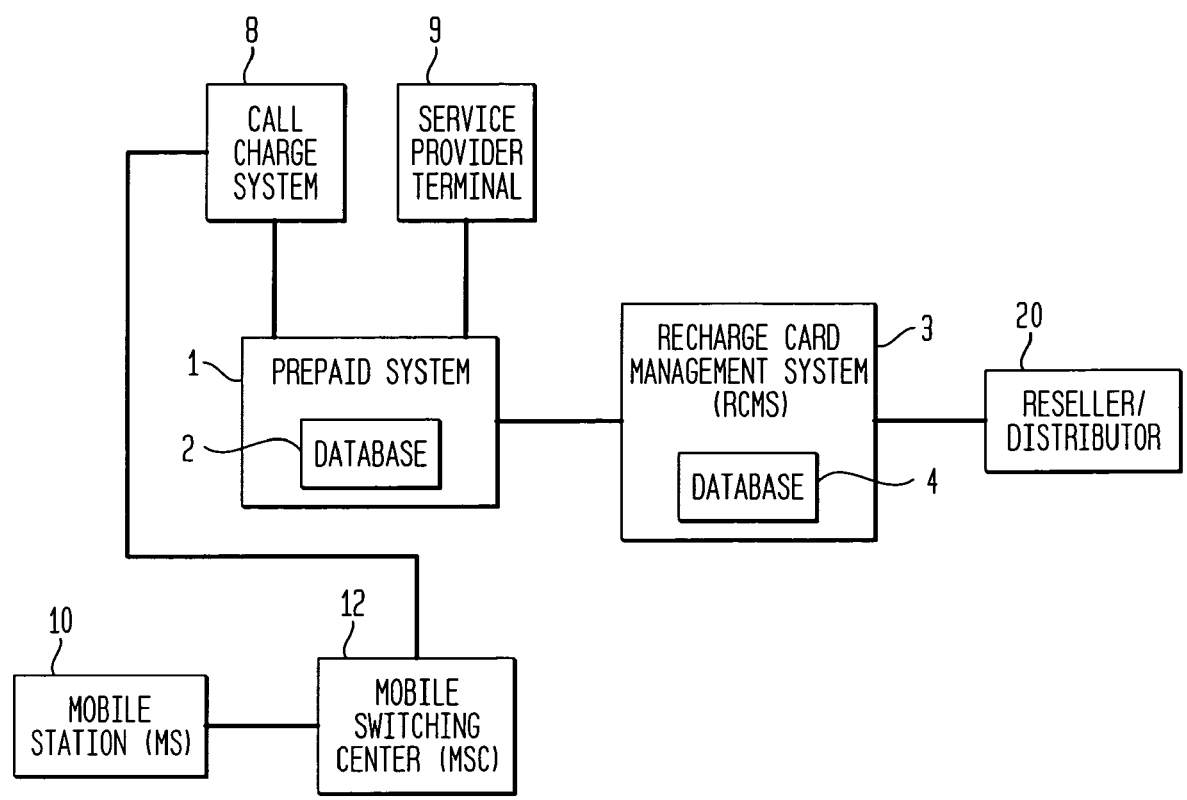
FIG. 1 is a block diagram of the scratch card system in accordance with Applicant's invention.

FIG. 1 is a block diagram illustrating the operation of Applicant's invention. A customer goes to a reseller/distributor 20, such as Walmart, where the customer purchases a scratch card. Physically, the scratch card is a plastic card with a face value, an identifying number and a hidden personal identification number (PIN). The recharge card management system 3 has previously activated the personal identification number (PIN) of the cards which the reseller is authorized to sell. The recharge card management system has a database 4 which contains the PIN of the scratch card and, in response to the reseller's message, populates the database with details such as the scratch card ID, the face amount of the scratch card, and the reseller ID. If the customer activates the card from a mobile station 10, the customer transmits the PIN plus the card identification via a call charge system 8 which adds the customer's identification, to the prepaid system 1. This system forwards the customer's identification, the card number and the PIN to the Recharge Card Management System (RCMS) for authentication of the PIN, and to update the RCMS database. In response to a positive authentication from the RCMS, which also supplies the recharge rate plan (which includes information such as a reseller type, recharge rate, recharge media allowed, recharge location allowed) recharge date and time, recharge expiration date, the prepaid system, which stores the customer's class of service, converts the face amount to an inflated face amount corresponding to the number of call units that the customer is entitled to from the scratch card. This amount, referred to hereinafter as the initial balance, is stored in the database 2 of the prepaid system. The amount is decremented as the customer makes calls using the scratch card. In order to avoid confusing the customer when the customer makes a request for his/her remaining balance, the amount reported to the customer is a fraction of the face value of the card not the fraction of the initial balance. The reported amount can be derived from the initial balance, the original face amount, and the remaining balance or it can be derived through an inverse use of the rules used to derive the initial balance.

In addition the mobile customer 10 can communicate with the prepaid system 1 via its mobile switching center (MSC) 12. This path can be used for making inquiries for a remaining balance.

A terminal 9 from a service provider can access the prepaid system to edit rules and conditions for deriving recharge rate plans.

Figure 2:
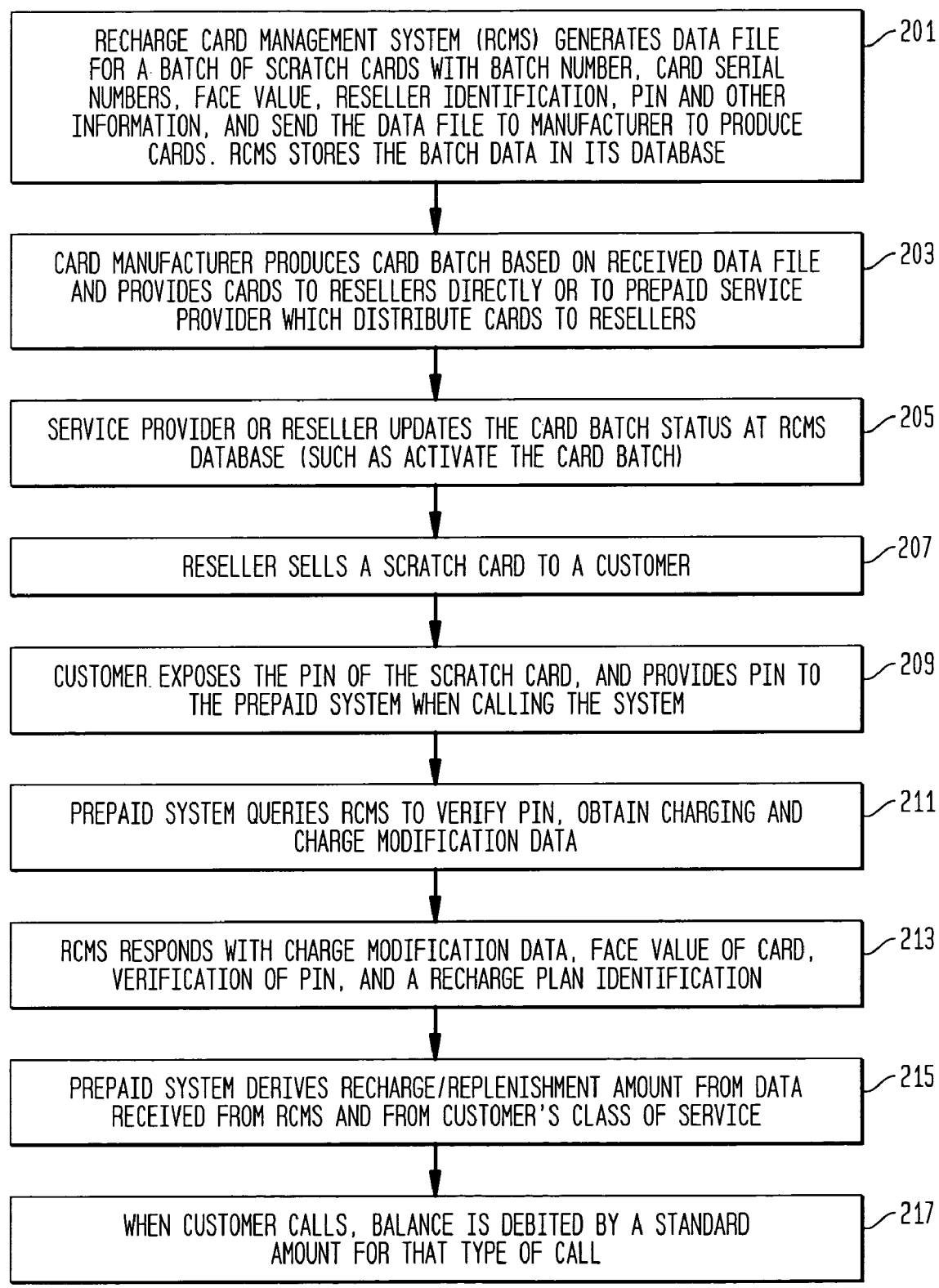
FIG. 2 is a flow diagram illustrating the process of deriving a balance for a scratch card.

FIG. 2 is a flow diagram illustrating the operation of Applicants' invention. A Recharge Card Management System (RCMS) of a prepaid service provider generates a data file for a batch of scratch cards with card numbers, face value, reseller identification, and PIN values and sends the data file of card batch to a manufacturer to produce the cards. RCMS also stores all data of card batch in its database (action block 201). The card manufacturer produces a card batch based on received data file and provides cards to resellers directly or to prepaid service provider which distribute cards to resellers (action block 203). The service provider, or distributor or reseller updates the card batch status (such as activated) in the RCMS database (action block 205). The reseller sells the customer a scratch card (action block 207). The customer exposes the PIN of the scratch card and provides the PIN to the prepaid system when the customer calls the system (action block 209). The prepaid system queries the RCMS to verify the PIN and to obtain charging and charge modification data for the card (action block 211). The RCMS responds with data for use in calculating charge modifications for the customer, a verification of the PIN, the face value of the card, and a recharge rate plan ID (action block 213). The prepaid system derives the recharge/replenishment amount for the subscriber's prepaid account from the card face amount and the charging and charge modification data received from the RCMS as well as the customer's class of service stored in the prepaid system (action block 215). The prepaid system also derives recharge life cycle data (e.g., expiration date, next recharge date deadline). Subsequently when the customer makes a call, the prepaid balance is debited by a standard amount for that type of call (action block 217).

FIG. 3 illustrates what happens when a caller calls the charge system to find out how much of his/her scratch card face amount is still left. While internally the system uses the balance as a way of keeping track of how much is available for future calls, it is desirable to report to the customer in terms of the face amount of the card since that is what the customer is familiar with. Accordingly, the remaining balance is converted into an equivalent face card balance by multiplying the remaining balance with the ratio of the initial face card value to the initial balance.

The arrangement of this invention provides for a very flexible scratch card prepayment system. Based on a recharging rate rule condition list, the operator can define the following subscriber recharge rate adjustment policy:

No adjustment policy. The recharge amount is exactly from scratch card face value. For example, if recharge rate is higher than call rate, or the recharge is from particular states. Another example is no reseller identification provided.

Recharge rate plan based adjustment policy. The recharge plan is based on input of recharge rate ID, or derived from other conditions.

Bonus adjustment policy. The rule set defines whether a bonus will be generated for the recharge.

Resellers or distributors based adjustment policy. Reseller types differentiate the recharge rate plan.

Card face value based adjustment policy. Usually, the larger the face values are, cheaper the call rate will be. For example, the rule is set that the card with face value $25 has $0.50/min recharge rate and that the card with face value $100 has $0.20/min recharge rate.

Recharge location and date/time adjustment policy. Promotion may be limited to a range of recharge time and locations (states). For example, if the end user buys a scratch card within promotion period, but recharge several months later (it is out of promotion period), it is not allowed to get promotion rate. Another example, K-Mart recharge cards are only allowed to get promotion rate in certain states.

Recharge media based adjustment policy. The promotion rate is differentiated by recharge medias. For example, recharge through CSR will get no bonus recharge amount.

COS based adjustment policy. The recharge rate plan is differentiated by subscriber current call rate plan. If the subscriber has a call rate plan of $0.20 per minutes, recharge rate plan is $0.30 per minute, recharge rate will be based on $0.20 per minutes.

FIG. 4 illustrates the basic policy management mechanism for scratch card recharge at the prepaid application system. In this invention, the core recharge service control logic is defined as sets of rules in policy management. The specific recharge has its own service rule. All the policy rules are stored at policy repository 415. The rules in the policy repository are divided into different categories: such as: recharge rate rule, bonus rule, reseller rule, face value rule, date/time rule, location rule, media component rule, COS rule, etc. The prepaid system receives input from the recharge card management system 3.

FIG. 4 shows a portion 401 of the prepaid system that controls the recharge function. It includes block 403 for managing subscriber accounts, block 405 which contains the recharge service control logic, and block 407 for getting access from various sources to modify the data in the prepaid system. The recharge service control logic (405) contains a policy enforcement point 409 for accessing a rule-based recharge call control. The rule-based recharge call control (411) includes a policy decision point (PDP) 413 for interacting with the policy enforcement point and for accessing a policy repository 415.

The policy enforcement point (PEP 409) in the recharge service logic will communicates with policy decision point (PDP 413) to reserve the decision request. The PDP 413 will access the policy repository (415) to obtain relevant rules that are evaluated to determine the decision response. Once a decision response is obtained, the recharge service logic will determine the recharge adjusted amount and credit the amount or unit to subscriber's account.

In the service policy management, a rule is expressed as a condition list and a sequence of actions.

```
IF    Condition_List
THEN
        Sequence_Actions
END IF
```

The condition list is constructed by a list of condition linked by BOOL operator AND, OR, and NOT in CNF (Conjunctive Normal Form). When a rule is invoked, the rule condition will be evaluated in PDP, if the rule condition is matched, all actions under the rule will be executed in the order.

By using the recharge rate plan determination for example, the recharge adjust amount will be based on recharge rate plan ID, reseller ID, recharge location/time. Some examples of rules and executions are given as the following.

A. Compare Recharge Rate Plan and Subscriber Call Rate Plan.

Recharge rate is determined as the following rules:

| Recharge_Rate_ID | Recharge Rate Plan (dollar/minutes) |
|---|---|
| 7011 | 0.25 |
| 7012 | 0.30 |
| 7013 | 0.50 |
| ... | ... |

IF     Recharge_Rate_ID = "7013"
THEN Recharge_Rate_Plan = "0.50"
END IF

Subscriber call rate is determined as the following rules:

| Class of Service (COS) ID | Call Rate (dollar/minutes) |
|---|---|
| 101 | 0.25 |
| 102 | 0.30 |
| 103 | 0.50 |
| ... | ... |

IF     COS_ID = "101"
THEN Call_Rate = "0.25"
END IF
IF     Call_Rate < Recharge Rate
THEN Recharge Adjustment ID = "0000"
END IF Recharge Adjustment ID "0000" means no recharge adjustment.

B. Recharge Rate Plan Rules.

Recharge Adjustment is Determined as the following Rules:

| Recharge Rate ID | Reseller ID | Recharge Face Value | Recharge Location | Recharge Start Date/Time | Recharge Stop Date/Time | Recharge Adj_ID |
|---|---|---|---|---|---|---|
| 7011 | 3001 | $50 | CA | 01/01/05 8:30 AM | 03/31/05 5:30 PM | 8001 |
| 7011 | 3001 | $50 | IL | 01/01/05 8:30 AM | 03/31/05 5:30 PM | 8001 |
| 7011 | 3002 | $30 | CA | 01/01/05 8:30 AM | 03/31/05 5:30 PM | 8002 |
| 7011 | 3002 | $30 | IL | 01/01/05 8:30 AM | 03/31/05 5:30 PM | 8002 |
| ... | ... | ... | | | | |

IF     Recharge_Rate_ID = "7011" AND Reseller_ID ="3001"
       AND Recharge_Face_Value = "$50" AND Recharge_Location = "CA"
       AND Recharge_Start_Date_Time =>"01/01/05_0830AM"
       AND Recharge_Stop_Date_Time =<"03/31/05_0530PM"
THEN Recharge_Adjustment_ID = "8001"
END IF
IF     Recharge_Rate_ID = "7011" AND Reseller_ID ="3002"
       AND Recharge_Face_Value = "$30"AND
       Recharge_Location = "IL"
       AND Recharge_Start_Date_Time =>"01/01/05_0830AM"
       AND Recharge_Stop_Date_Time =<"03/31/05_0530PM"
THEN Recharge_Adjustment_ID = "8002"
END IF
... ...

Recharge Adjustment ID "8001" means to recharge adjustment to recharge rate, and "8002" means to recharge adjustment to recharge rate plus 20 minutes bonus.

If a subscriber with COS_ID=103 (Call Rate=$0.50/min) recharge his account using a $50 recharge scratch card distributed by K-Mart (Reseller ID=3001) with recharge rate $0.25/min (Recharge rate ID=7011) in State of California within promotion period (say Feb. 1, 2005), the recharge adjustment ID from rule decision is 8001 means to stay with recharge rate plan 7011. His account will be credit with $100 or equivalent unit.

If a subscriber with COS_ID=103 (Call Rate=$0.50/min) recharge his account using a $50 recharge scratch card distributed by Walgreen (Reseller ID=3002) with recharge rate $0.25/min (Recharge rate ID=7011) in State of Illinois within a promotion period (say Feb. 1, 2005), the recharge adjustment ID from rule decision is 8002 means to stay with recharge rate plan 7011 and plus 20 minutes bonus. His account will be credited with $100 plus $5 bonus, total $105 or equivalent unit.

The above example is only one rule set. Any rule sets related to scratch card recharge with various combinations of different rules can be used.

The above description is of one preferred embodiment of Applicant's invention. Other embodiments will be apparent to those of ordinary skill in the art without departing from the scope of the invention. The invention is limited only by the attached claims.

I claim:

1. A method of authorizing different quantities of telecommunications service for scratch cards with the same value, comprising the steps of:
responsive to the activation of a scratch card, creating a recharge/replenishment amount derived from the face value of the card and increased in accordance with an identification of a reseller who has arranged to provide telecommunications services in excess of the face value of the scratch card;
storing said recharge/replenishment amount for a customer in a database of a prepayment system; and
responsive to the customer making a call, debiting said recharge/replenishment amount with standard call charges for said call independent of an identity of said reseller who sold the scratch card to the customer.

2. The method of claim 1 further comprising the step of:
assigning different recharge rate plans to different scratch cards.

3. The method of claim 1 further comprising the step of:
deriving recharge rate plans using programmed rules and input conditions.

4. The method of claim 3 wherein said programmed rules and conditions are interpreted by a policy management system (rule engine) for interpreting conditions and rule logic rules to derive an output recharge/replenishment amount.

5. A method of authorizing different quantities of telecommunications service for scratch cards with the same value, comprising the steps of:
responsive to the activation of a scratch card, creating a recharge/replenishment amount derived from the face value of the card and increased in accordance with an identification of a reseller who has arranged to provide telecommunications services in excess of the face value of the scratch card;
storing said recharge/replenishment amount for a customer in a database of a prepayment system;
responsive to the customer making a call, debiting said recharge/replenishment amount with standard call charges for said call independent of an identity of said reseller who sold the scratch card to the customer;

deriving recharge rate plans using programmed rules and input conditions;

wherein said programmed rules and conditions are interpreted by a policy management system (rule engine) for interpreting conditions and logic rules to derive an output recharge/replenishment amount; and searching, viewing and editing rule sets and input conditions from a terminal of a service provider.

6. A method of authorizing different quantities of telecommunications service for scratch cards with the same value, comprising the steps of:

responsive to the activation of a scratch card, creating a recharge/replenishment amount derived from the face value of the card and increased in accordance with an identification of a reseller who has arranged to provide telecommunications services in excess of the face value of the scratch card;

storing said recharge/replenishment amount for a customer in a database of a prepayment system;

responsive to the customer making a call, debiting said recharge/replenishment amount with standard call charges for said call independent of an identity of said reseller who sold the scratch card to the customer;

deriving recharge rate plans using programmed rules and input conditions; and interpreting ones of said input conditions to determine recharge life cycle data.

7. The method of claim 1 further comprising the step of:
providing a customer with an indication of a balance consistent with an initial face card amount of said customer's scratch card.

8. The method of claim 7 further comprising the step of:
storing a conversion factor between a face card amount and a prepaid charge amount for a customer.

9. The method of claim 1 further comprising the step of:
editing rule sets from a terminal of a service provider to change one or more recharge rate plans.

10. Apparatus for providing different quantities of telecommunications service for scratch cards with the same value, comprising:

means, responsive to the activation of a scratch card, for creating a recharge/replenishment amount derived from the face value of the card and increased in accordance with an identification of a reseller who has arranged to provide telecommunications services in excess of the face value of the scratch card;

a database of a prepayment system for storing said recharge/replenishment amount for a customer; and means, responsive to the customer making a call, for debiting said recharge/replenishment amount with standard call charges for said call independent of an identity of said reseller who sold the scratch card to the customer.

11. The apparatus of claim 10 further comprising means for assigning different recharge rate plans to different scratch cards.

12. The apparatus of claim 10 further comprising means for deriving recharge rate plans using programmed rules and input conditions.

13. The apparatus of claim 12 wherein said programmed rules and conditions are interpreted by a policy management system (rule engine) for interpreting conditions and logic rules to derive an output recharge/replenishment amount.

14. Apparatus for providing different quantities of telecommunications service for scratch cards with the same value, comprising:

means, responsive to the activation of a scratch card, for creating a recharge/replenishment amount derived from the face value of the card and increased in accordance with an identification of a reseller who has arranged to provide telecommunications services in excess of the face value of the scratch card;

a database of a prepayment system for storing said recharge/replenishment amount for a customer;

means, responsive to the customer making a call, for debiting said recharge/replenishment amount with standard call charges for said call independent of an identity of said reseller who sold the scratch card to the customer;

means for deriving recharge rate plans using programmed rules and recharge conditions; and a terminal of a service provider for searching, viewing and editing said rule sets and input conditions.

15. Apparatus for providing different quantities of telecommunications service for scratch cards with the same value, comprising:

means, responsive to the activation of a scratch card, for creating a recharge/replenishment amount derived from the face value of the card and increased in accordance with an identification of a reseller who has arranged to provide telecommunications services in excess of the face value of the scratch card;

a database of a prepayment system for storing said recharge/replenishment amount for a customer;

means, responsive to the customer making a call, for debiting said recharge/replenishment amount with standard call charges for said call independent of an identity of said reseller who sold the scratch card to the customer;

means for deriving recharge rate plans using programmed rules and input conditions;

wherein said programmed rules and conditions are interpreted by a policy management system (rule engine) for interpreting conditions and logic rules to derive an output recharge/replenishment amount;

means for interpreting ones of said input conditions to determine recharge life cycle data for said recharge/replenishment amount.

16. The apparatus of claim 10 further comprising means for providing a customer with an indication of a balance consistent with an initial face card amount of said customer's scratch card.

17. The apparatus of claim 16 further comprising means for storing a conversion factor between a face card amount and a prepaid charge amount for a customer.

18. The apparatus of claim 10 further comprising a terminal of a service provider for editing rule sets to change one or more recharge rate plans.

* * * * *

UNITED STATES PATENT AND TRADEMARK OFFICE
CERTIFICATE OF CORRECTION

PATENT NO. : 7,643,623 B2  
APPLICATION NO. : 11/133934  
DATED : January 5, 2010  
INVENTOR(S) : Yigang Cai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1264 days.

Signed and Sealed this

Twenty-first Day of December, 2010

David J. Kappos  
*Director of the United States Patent and Trademark Office*